United States Patent [19]

Hisgen et al.

[11] Patent Number: 4,748,229

[45] Date of Patent: May 31, 1988

[54] FULLY AROMATIC THERMOTROPIC POLYESTERS

[75] Inventors: Bernd Hisgen, Limburgerhof; Hans-Jakob Kock, Ludwigshafen; Michael Portugall, Wachenheim; Erhard Seiler, Ludwigshafen; Gerd Blinne, Bobenheim, all of Fed. Rep. of Germany

[73] Assignee: BASF Aktiengesellschaft, Ludwigshafen, Fed. Rep. of Germany

[21] Appl. No.: 77,281

[22] Filed: Jul. 24, 1987

[30] Foreign Application Priority Data

Aug. 28, 1986 [DE] Fed. Rep. of Germany ....... 3629210

[51] Int. Cl.$^4$ .................. C08G 63/54; C08G 63/60; C08G 69/44
[52] U.S. Cl. ..................... 528/183; 528/171; 528/176; 528/190; 528/191; 528/193; 528/194
[58] Field of Search ............. 528/171, 183, 176, 190, 528/191, 193, 194

[56] References Cited

U.S. PATENT DOCUMENTS

| | | | |
|---|---|---|---|
| 4,083,829 | 4/1978 | Calundann et al. | 528/171 X |
| 4,156,070 | 5/1979 | Jackson et al. | 528/191 |
| 4,272,625 | 6/1981 | McIntyre et al. | 528/183 |
| 4,355,132 | 10/1982 | East et al. | 528/183 X |
| 4,412,058 | 10/1983 | Siemionko | 528/191 |
| 4,447,593 | 5/1984 | Funakoshi et al. | 528/176 |
| 4,499,259 | 2/1985 | Irwin | 528/190 |
| 4,539,386 | 9/1985 | Yoon | 528/183 |
| 4,564,669 | 1/1986 | Dicke et al. | 528/173 |
| 4,614,789 | 9/1986 | Dicke et al. | 528/128 |

*Primary Examiner*—Lucille M. Phynes

*Attorney, Agent, or Firm*—Oblon, Fisher, Spivak, McClelland & Maier

[57] ABSTRACT

Fully aromatic thermotropic polyesters are based on
(A) from 30 to 60 mol % of 4-hydroxybenzoic acid,
(b) from 20 to 35 mol % of a mixture of
  ($B_1$) terephthalic acid and
  ($B_2$) isophthalic acid,
  the molar ratio of $B_1$ to $B_2$ being from 1.04:1 to 19:1, and
(C) from 20 to 35 mol % of a mixture of
  ($C_1$) hydroquinone,
  ($C_2$) 4,4'-dihydroxydiphenyl and
  ($C_3$) from 0.5 to 5 mol % of
    ($C_{31}$) 2,7-dihydroxynaphthalene and/or
    ($C_{32}$) 1,3-dihydroxybenzene and/or
    ($C_{33}$) and aromatic dihydroxy compound of the general formula I

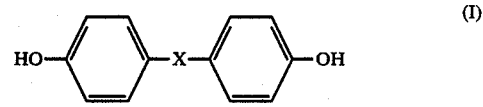

(I)

where X is —$CH_2$—, —$C(CH_3)_2$—, —S—, —$SO_2$—, —O— or —CO—, and/or
($C_{34}$) a compound of the general formula II

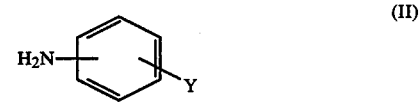

(II)

where Y is $NH_2$ or OH,
the molar ratio of $C_1$ to $C_2$ being from 0.1:1 to 2.67:1 and the molar ratio of B to C being from 0.9:1 to 1.1:1.

10 Claims, No Drawings

FULLY AROMATIC THERMOTROPIC POLYESTERS

The present invention relates to fully aromatic thermotropic polyesters based on
(A) from 30 to 60 mol % of 4-hydroxybenzoic acid,
(B) from 20 to 35 mol % of a mixture of
 ($B_1$) terephthalic acid and
 ($B_2$) isophthalic acid,
 the molar ratio of $B_1$ to $B_2$ being from 1.04:1 to 19:1, and
(C) from 20 to 35 mol % of a mixture of
 ($C_1$) hydroquinone,
 ($C_2$) 4,4'-dihydroxydiphenyl and
 ($C_3$) from 0.5 to 5 mol % of
 ($C_{31}$) of 2,7-dihydroxynaphthalene and/or
 ($C_{32}$) of 1,3-dihydroxybenzene and/or
 ($C_{33}$) an aromatic dihydroxy compound of the general formula I

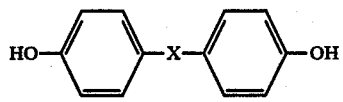

where X is —$CH_2$—, —$C(CH_3)_2$, —S—, —$SO_2$—, —O— or —CO—, or their chlorine, bromine, aryl or $C_1$-$C_8$-alkyl or alkoxy derivatives which are substituted in the nucleus, and/or
($C_{34}$) a compound of the general formula II

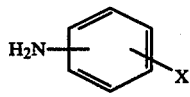

where X is —$NH_2$ or —OH and the substituents are meta or para to one another, or their chlorine, bromine, aryl or $C_1$-$C_8$-alkyl or alkoxy derivatives which are substituted in the nucleus, the molar ratio of $C_1$ to $C_2$ being from 0.1:1 to 2.67:1 and the molar ratio of B to C being from 0.9:1 to 1.1:1.

The present invention furthermore relates to a process for the preparation of such polyesters and their use for the production of fibers, films and moldings, and moldings which contain the novel fully aromatic thermotropic polyesters as essential components.

Substances which are referred to very generally as being thermotropic are those which form liquid crystalline melts, ie. melts having anisotropic properties.

Thermotropic aromatic polyesters obtained from aromatic dicarboxylic acids and dihydroxy compounds, with or without aromatic hydroxycarboxylic acids, are known and are described in, for example, GB-A-No. 2 061 304, DE-A-No. 20 25 971, EP-A-No. 33 147 and EP-A-No. 92 843. The disadvantage of these known systems is that they have to be prepared by a complicated and time-consuming multistage process. Furthermore, the products generally have melting points above 350° C., which substantially complicates thermoplastic processing.

DE-A-No. 35 17 587 describes thermoplastic molding materials which contain, in addition to a basic resin of an oxybenzoyl copolyester, a fairly small amount of a polymeric flow modifier which consists of terephthalic acid, isophthalic acid, 4-hydroxybenzoic acid, hydroquinone and 4,4'-dihydroxydiphenyl. The flow modifiers described in the Examples have very high melting points on the one hand (Example 3: higher than 400° C.) or, on the other hand, do not have a crystalline melting point, ie. possess only poor heat distortion resistance.

EP-A No. 131 846 discloses thermotropic polyesters obtained from 4-hydroxybenzoic acid, iso- and/or terephthalic acid, 2,7-dihydroxynaphthalene and, if required, a further dihydroxy component. However, these polyesters have a 2,7-dihydroxynaphthalene content of not less than 5 mol %, which makes the products more expensive without bringing advantages with regard to their properties.

It is an object of the present invention to provide fully aromatic thermotropic polyesters which, in comparison with the flow modifiers described in DE-A-No. 35 17 587, can be more readily processed by thermoplastic methods and at the same time have improved heat distortion resistance; compared with the products of EP-A No. 131 846, the intention is to provide more economical products having the same or improved properties.

We have found that this object is achieved, according to the invention, by the fully aromatic thermotropic polyesters defined at the outset.

For the purposes of the present invention, polyesters include the products which contain amide bonds (originating from the $C_{34}$ monomers), although these products can in principle also be referred to as polyesteramides.

The novel fully aromatic polyesters are composed of units derived from 4-hydroxybenzoic acid (A), 3-hydroxybenzoic acid, terephthalic acid ($B_1$), isophthalic acid ($B_2$), hydroquinone ($C_1$), 4,4'-dihydroxydiphenyl ($C_2$) and one or more compounds $C_{31}$, $C_{32}$, $C_{33}$ or $C_{34}$.

The content of component A (4-hydroxybenzoic acid) is from 30 to 60, in particular from 35 to 55, mol %.

The mixtures of terephthalic acid ($B_1$) and isophthalic acid ($B_2$) which constitute component (B) are used in an amount of from 20 to 35, preferably from 22.5 to 32.5, mol %. The same also applies to the content of the mixture of dihydroxy compounds (component C).

The molar ratio of components $B_1$ to $B_2$, ie. of terephthalic acid to isophthalic acid, is from 1.04:1 to 19:1, preferably from 1.5:1 to 10:1.

Component C used in the preparation of the novel fully aromatic polyesters is composed of hydroquinone ($C_1$), 4,4'-dihydroxydiphenyl ($C_2$) and one or more of the compounds $C_{31}$, $C_{32}$, $C_{33}$ and/or $C_{34}$.

The molar ratio of hydroquinone ($C_1$) to 4,4'-dihydroxydiphenyl ($C_2$) is from 0.1:1 to 2.67:1, in particular from 0.5:1 to 2.33:1.

The compounds $C_{31}$ and $C_{32}$ are 2,7-dihydroxynaphthalene ($C_{31}$) and 1,3-dihydroxybenzene (resorcinol; $C_{32}$).

The compounds $C_{33}$ are aromatic dihydroxy compounds of the general formula I

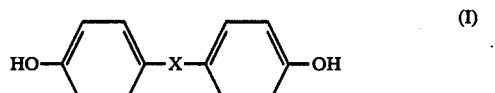

where X is —$CH_2$—, —$C(CH_3)_2$—, —S—, —$SO_2$—, —O— or —CO—, or their chlorine, bromine, aryl or $C_1$–$C_8$-alkyl or alkoxy derivatives which are substituted in the nucleus.

Among these derivatives, those in which X is —C(CH$_3$)$_2$, —S—, —SO$_2$—, —O— or —CO— are preferred and, among these, in particular 4,4'-dihydroxydiphenyl sulfone (X=SO$_2$) and 2,2-di-(4-hydroxyphenyl)-propane (X=C(CH$_3$)$_2$).

Among the derivatives substituted in the nucleus, the chlorine, bromine and $C_1$–$C_6$-alkyl derivatives are particularly preferred. Examples of these are compounds of the formula

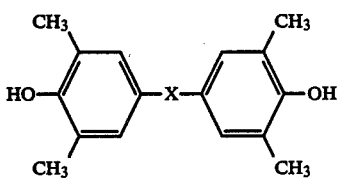

where X is —C(CH$_3$)$_2$— or —SO$_2$—, and the corresponding chlorine derivatives.

Preferred compounds $C_{34}$ of the general formula II

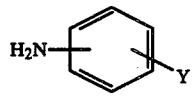

(II)

where X is —OH or —NH$_2$, are 3- and 4-aminophenol and 1,4-diaminobenzene, in particular the two first-mentioned compounds.

As in the case of the compounds $C_{33}$, preferred substituted derivatives of the general formula II are the $C_1$–$C_6$-alkyl, chlorine and bromine derivatives, such as 2-methyl-4-aminophenol or 2-chloro-4-aminophenol, to mention only two typical members of this group.

In principle, it is possible to use the compounds $C_{31}$, $C_{32}$, $C_{33}$ and $C_{34}$ individually or in any desired mixtures. The compounds are preferably used individually, but in some cases it has proven advantageous to employ mixtures of these compounds.

Such mixtures can consist of, for example, 2,7-dihydroxynaphthalene and resorcinol, resorcinol and 2,2-di-(4-hydroxyphenyl)-propane, and resorcinol and 3- or 4-aminophenol, to mention a few preferred examples.

In any case, the content of component $C_3$, which is composed of one or more of the compounds $C_{31}$, $C_{32}$, $C_{33}$ and $C_{34}$, is from 0.5 to 5, preferably from 1 to 4, mol %.

The thermotropic, ie. liquid crystalline, state of the novel fully aromatic polyesters can be detected, for example, with a polarization microscope, using a method described in German Laid-Open Application DOS No. 2,520,819. Between crossed polarizers, the polymer melts applied in a layer thickness of 10 μm between glass plates have textures which may be assigned to a mesomorphic phase.

The melting point of the novel polyesters is as a rule from 280° to 350° C., in particular from 300° to 350° C.

The heat distortion point, determined according to ISO/R75, method B, is generally greater than 200° C., in particular greater than 250° C.

The shear modulus, determined according to DIN 53,445, is generally not less than 25% at 200° C., in particular not less than 28% of the value measured at 20° C. under otherwise identical conditions.

The relative viscosity of the novel fully aromatic polyesters, determined in 0.1% strength by weight solution in pentafluorophenol at 60° C., is preferably from 1 to 4, in particular from 1.5 to 3.5, dl/g.

The novel thermotropic polyesters can be prepared in principle by a conventional method, as described in, for example, US-A-No. 4 375 530 and 4 118 372.

Advantageously, a process is used in which the starting materials A, $B_1$, $B_2$, $C_1$, $C_2$ and $C_3$ are subjected to a single-stage polycondensation in the melt, in the presence of a 5–60% molar excess of an anhydride of an alkanecarboxylic acid of 2 to 6 carbon atoms. The molar excess of anhydride is based on the total content of OH groups in the monomer mixture.

Among the anhydrides of the alkanecarboxylic acids of 2 to 6 carbon atoms, acetic anhydride, propionic anhydride and butyric anhydride are preferred, acetic anhydride being very particularly preferred. The molar excess of anhydride is preferably from 10 to 50 mol %.

It has also proven advantageous to carry out the reaction under an inert gas atmosphere, for example nitrogen or argon.

It is sometimes advantageous to accelerate the reaction by using catalysts, for example those described in EP-A-No. 131 846. In this case, the content of these catalysts is from 0.001 to 1% by weight, based on the total amount of the monomers used.

A particularly preferred embodiment of a process is described below.

The monomers A, $B_1$, $B_2$, $C_1$, $C_2$ and $C_3$ and the carboxylic anhydride are mixed under an inert gas atmosphere, and the stirred mixture is refluxed. During this procedure, it is advantageous to increase the temperature stepwise by first maintaining a temperature of from 130 to 200° C. for up to 5, preferably up to 2, hours and then increasing the temperature to 250°–370° C., preferably in the course of from 2 to 2.5 hours. Excess carboxylic anhydride and carboxylic acids formed are distilled off in the course of the reaction.

To achieve as quantitative a conversion as possible, it is advantageous to employ reduced pressure, preferably from 0.1 to 200 mbar (from 10 to 20,000 Pa), in the final phase of the reaction.

The resulting fully aromatic polyesters can then be subjected to postcondensation in the solid phase. This is preferably carried out at from 200° to 300° C., particularly preferably from 200° to 280° C. It is also possible for the postcondensation to be carried out in the solid phase after thermoplastic processing.

The condensation in the solid phase is advantageously carried out in an inert gas atmosphere, for example under nitrogen or argon.

In the process described above, fully aromatic polyesters having advantageous properties are obtained in one stage in a relatively short time.

Conventional additives and processing assistants can be added to the novel fully aromatic polyesters. The only substances mentioned here are oxidation stabilizers, heat stabilizers, UV stabilizers, lubricants, mold release agents, dyes and pigments, fibrous or powdered fillers and reinforcing agents, nucleating agents and plasticizers. Additives of this type are known per se and are described in the literature.

Examples of oxidation stabilizers and heat stabilizers are halides of metals of group I of the Periodic Table, if necessary as a mixture with copper(I) halides or sterically hindered phenols in concentrations of up to 1% by weight.

Suitable UV stabilizers are substituted resorcinols, salicylates, benzotriazoles, benzophenones and mixtures of these, which are added in general in amounts of up to 2% by weight.

Dyes and pigments are generally used in amounts of up to 5% by weight. Examples are nigrosine, titanium dioxide, cadmium sulfide, phthalocyanine dyes, ultramarine blue and carbon black.

Examples of fillers and reinforcing agents are carbon fibers, glass fibers, amorphous silica, calcium silicate, aluminum silicate, magnesium carbonate, kaolin, chalk, powdered quartz, mica and feldspar, which may account for up to 70% by weight, based on the total weight of the filled material.

Examples of nucleating agents are talc, calcium fluoride, sodium phenylphosphinate, alumina and finely divided polytetrafluoroethylene.

Up to 20% by weight of plasticizers, such as phthalates, hydrocarbon oils and sulfonamides, may also be used.

The novel fully aromatic polyesters and the moldings produced from them have excellent heat distortion resistance and a smooth, glossy and abrasion-resistant surface coupled with a pale natural color. Furthermore, they are substantially resistant to chemicals and flameretardant and, for polyesters, possess excellent stability to hydrolysis.

Moldings produced from the novel fully aromatic polyesters possess excellent mechanical properties, in particular rigidity, strength and toughness. The said polyesters are therefore particularly useful for the production of moldings for the electrical industry, electronic computing and accounting machines, automotive construction and other industrial areas.

The polyesters according to the invention can also be used to produce fibers and films having a good property spectrum.

The novel polyesters can, as a rule, be processed at below 370° C. by injection molding, pressing or extrusion. trusion.

EXAMPLE 1

The novel polyester was prepared using the following components:
4.5 moles (42.85 mol %) of 4-hydroxybenzoic acid,
2.7 moles (25.73 mol %) of terephthalic acid,
0.3 mole (2.85 mol %) of isophthalic acid,
1.5 moles (14.29 mol %) of hydroquinone,
1.2 moles (11.43 mol %) of 4,4'-dihydroxydiphenyl and
0.3 mole (2.85 mol %) of 1,3-dihydroxybenzene (resorcinol).

These components were initially taken under nitrogen in a 5 l reaction kettle, together with 1350 ml (14.3 moles) of acetic anhydride. The stirred mixture was further heated to 150° C. in the course of 30 minutes and then to 345° C. (external temperature) in the course of 150 minutes. Thereafter, the pressure was reduced to 600 mbar and subsequently, in each case in the course of 10 minutes, to half the previous value. The external temperature was increased to 360° C. during this procedure.

The final pressure was 75 mbar.

The intrinsic viscosity of the resulting polyester was 1.8 dl/g, measured in 0.1% strength by weight solution in pentafluorophenol at 60° C.

The polyester gave a filament-forming mesomorphic melt.

DSC (differential scanning calorimetry) measurements indicated a melting point of 345° C.

The polymer could readily be processed at 360° C. by injection molding.

The heat distortion point according to ISO/R75, method B, was higher than 250° C.

The shear modulus according to DIN 53,445 at 200° C. was still 32% of the value measured at 20° C. under otherwise identical conditions.

EXAMPLE 2

The following components were used:
4.5 moles (42.85 mol %) of 4-hydroxybenzoic acid,
2.7 moles (25.74 mol %) of terephthalic acid,
0.3 mole (2.85 mol %) of isophthalic acid,
1.5 moles (14.28 mol %) of hydroquinone,
1.2 moles (11.43 mol %) of 4,4'-dihydroxydiphenyl and
0.3 mole (2.85 mol %) of 2,7-dihydroxynaphthalene.

The starting compounds were mixed with 1330 ml (14.1 moles) of acetic anhydride and reacted as described in Example 1.

The final temperature was 360° C. and the final pressure was 20 mbar.

The intrinsic viscosity was measured as 2.2 dl/g, determined as in Example 1.

The melting point (from DSC measurements) was 330° C.

The polymer could readily be processed at 340° C. by injection molding; the heat distortion point according to ISO/R75 was 248° C., or, according to method B, more than 250 °C.

The shear modulus according to DIN 53,445 at 200° C. was still 36% of the value measured at 20° C. under otherwise identical conditions.

EXAMPLE 3

The following starting compounds were used:
4.5 moles (42.85 mol %) of 4-hydroxybenzoic acid,
2.4 moles (22.89 mol %) of terephthalic acid,
0.6 mole (5.70 mol %) of isophthalic acid,
1.5 moles (14.28 mol %) of hydroquinone,
1.2 moles (11.43 mol %) of 4,4'-dihydroxydiphenyl and
0.3 mole (2.85 mol %) of resorcinol.

The starting components were reacted together with 320 ml (14 moles) of acetic anhydride, as described in Example 1. The final temperature was 360° C. and the final pressure 50 mbar.

The intrinsic viscosity of the resulting product, determined as in Example 1, was 1.7 dl/g, the melting point from DSC measurements was 325° C. and the shear modulus according to DIN 53,445 at 200° C. was still 28% of the value determined at 20° C.

The polymer could readily be processed at 350° C. by injection molding.

EXAMPLE 4

The novel polyester was prepared using the following components:
4.5 moles (42.85 mol %) of 4-hydroxybenzoic acid,
2.4 moles (22.88 mol %) of terephthalic acid,
0.6 mole (5.70 mol %) of isophthalic acid,
1.2 moles (11.43 mol %) of hydroquinone,
1.5 moles (14.29 mol %) of 4,4'-dihydroxydiphenyl and
0.3 mole (2.85 mol %) of 4-aminophenol.

These components were initially taken under nitrogen in a 5 l reaction kettle, together with 1330 ml (14.1 moles) of acetic anhydride. The stirred mixture was further heated to 150° C. in the course of 30 minutes and then to an external temperature of 350° C. in the course of 150 minutes. Thereafter, the pressure was reduced to 690 mbar and subsequently, in each case in the course of 10 minutes, to half the previous value. The external temperature was increased to 360° C. during this procedure.

The final pressure was 43 mbar.

The intrinsic viscosity of the resulting polyester was 2.3 dl/g, measured in 0.1% strength by weight solution in pentafluorophenol at 60° C.

The polyester gave a filament-forming mesomorphic melt.

DSC (differential scanning calorimetry) measurements indicated a melting point of 345° C.

The polymer could readily be processed at 360° C. by injection molding.

The heat distortion point according to ISO/R75, method B, was higher than 250° C.

The shear modulus according to DIN 53,445 at 200° C. was still 31% of the value measured at 20° C. under otherwise identical conditions.

EXAMPLE 5

The following components were used:
4.5 moles (42.85 mol %) of 4-hydroxybenzoic acid,
2.7 moles (25.74 mol %) of terephthalic acid,
0.3 mole (2.85 mol %) of isophthalic acid,
1.5 moles (14.28 mol %) of hydroquinone,
1.2 moles (11.43 mol %) of 4,4'-dihydroxydiphenyl and
0.3 mole (2.85 mol %) of 3-aminophenol.

The starting compounds were mixed with 1330 ml (14.1 moles) of acetic anhydride and were reacted as described in Example 1.

The final temperature was 360° C. and the final pressure was 45 mbar.

The intrinsic viscosity was measured as 2.2 dl/g, determined as in Example 1.

The melting point (from DSC measurements) was 330° C.

The polymer could readily be processed at 350° C. by injection molding; the heat distortion point according to ISO/R75, method B, was higher than 250° C.

The shear modulus according to DIN 53,445 at 200° C. was still 36% of the value measured at 20° C. under otherwise identical conditions.

COMPARATIVE EXAMPLE 1

(Example 3 of German Laid-Open Application DOS No. 3,517,587)

The following components were used:
0.306 mole (50 mol %) of 4-hydroxybenzoic acid,
0.134 mole (21.85 mol %) of terephthalic acid,
0.019 mole (3.03 mol %) of isophthalic acid and
0.154 mole (25.12 mol %) of 4,4'-dihydroxydiphenyl.

The components were reacted with 67.4 ml of acetic anhydride, as described in Example 1.

The final external temperature was 360° C. and the final pressure 8 mbar.

In contrast to Examples 1 to 6, in which a filament-forming mesomorphic melt was obtained after the reaction, the reaction product in this case was solid and had a grayish yellow color.

The polymer could not be melted at below 400° C. and was insoluble in pentafluorophenol, so that it was also impossible to determine the relative viscosity.

A product which was prepared by the process described in DE-A-No. 35 17 587 (Example 3) and which had the same composition likewise could not be melted below 400° C. and therefore could not be processed by a thermoplastic method below this temperature.

COMPARATIVE EXAMPLE 2

(Example 4 from- DE-A-No. 35 17 587)

The following components were used:
0.37 mole (64.92 mol %) of 4-hydroxybenzoic acid,
0.1 mole (17.54 mol %) of isophthalic acid and
0.1 mole (17.54 mol %) of 4,4'-dihydroxydiphenyl.

The components were reacted with 62 ml of acetic anhydride, as described in Example 1.

The final temperature in this case was 330° C. and the final pressure 53 mbar.

The intrinsic viscosity of the resulting product was 1.9 dl/g, and the polymer showed a good tendency to filament formation from the anisotropic melt.

However, the shear modulus according to DIN 53,445 at 200° C. was only 0.6% of the value measured at 20° C. under otherwise identical conditions.

The above Examples show that the novel fully aromatic polyesters have a property spectrum which is substantially improved overall, particularly in comparison with the products disclosed in DE-A-No. 35 17 587.

We claim:

1. A fully aromatic thermotropic polyester based on
(A) from 30 to 60 mol % of 4-hydroxybenzoic acid,
(B) from 20 to 35 mol % of a mixture of
   ($B_1$) terephthalic acid and
   ($B_2$) isophthalic acid,
   the molar ratio of $B_1$ to $B_2$ being from 1.04:1 to 19:1, and
(C) from 20 to 35 mol % of a mixture of
   ($C_1$) hydroquinone,
   ($C_2$) 4,4'-dihydroxydiphenyl and
   ($C_3$) from 0.5 to 5 mol % of one or more compounds from the group consisting of
      ($C_{31}$) 2,7-dihydroxynaphthalene,
      ($C_{32}$) 1,3-dihydroxybenzene,
      ($C_{33}$) aromatic dihydroxy compounds of the formula I

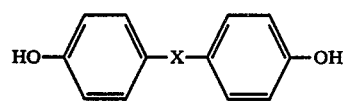

where X is $-CH_2-$, $-C(CH_3)_2-$, $-S-$, $-SO_2-$, $-O-$ or $-CO-$, or their chlorine, bromine, aryl or $C_1-C_8$-alkyl or alkoxy derivatives which are substituted in the nucleus, and
      ($C_{34}$) compounds of the formula II

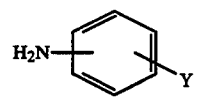

where X is $-NH_2$ or $-OH$ and the substituents are meta or para to one another, or their chlorine, bromine, aryl or $C_1-C_8$-alkyl or alkoxy derivatives which are substituted in the nucleus, the molar ratio of $C_1$ to $C_2$ being from 0.1:1 to 2.67:1 and the molar ratio of B to C being from 0.9:1 to 1.1:1.

2. A fully aromatic thermotropic polyester as claimed in claim 1, wherein the component $C_3$ is 2,7-dihydroxynaphthalene ($C_{31}$) and/or 1,3-dihydroxybenzene ($C_{32}$).

3. A fully aromatic thermotropic polyester as claimed in claim 1, wherein $C_3$ is an aromatic dihydroxy compound of the formula I, where X is $-C(CH_3)_2-$, $-S-$, $-SO_2-$, $-O-$ or $-CO-$.

4. A fully aromatic thermotropic polyester as claimed in claim 1, wherein the component $C_{34}$ is 4-aminophenol and/or 3-aminophenol.

5. A fully aromatic thermotropic polyester as claimed in claim 1, wherein the molar ratio of components $B_1$ to $B_2$ is from 1.5:1 to 10:1.

6. A fully aromatic thermotropic polyester as claimed in claim 1, wherein the molar ratio of components $C_1$ to $C_2$ is from 0.5:1 to 2.33:1.

7. A fully aromatic thermotropic polyester as claimed in claim 1, obtainable by single-stage polycondensation of components A, $B_1$, $B_2$, $C_1$, $C_2$ and $C_3$ in the melt, in the presence of a 5–60% molar excess, based on the total content of OH groups, of an anhydride of an alkanecarboxylic acid of 2 to 6 carbon atoms.

8. A process for the preparation of a fully aromatic thermotropic polyester as claimed in claim 1 by single-stage polycondensation in the melt, in the presence of an anhydride of an alkanecarboxylic acid of 2 to 6 carbon atoms, wherein the components A, $B_1$, $B_2$, $C_1$, $C_2$ and $C_3$ are reacted in the presence of a 5–60% molar excess, based on the total content of OH groups, of the anhydride of the alkanecarboxylic acid.

9. A process as claimed in claim 8, wherein, after the polycondensation in the melt, the resulting product is subjected to postcondensation in the solid phase.

10. A dimensionally stable molding containing, as an essential component, a fully aromatic thermotropic polyester as claimed in claim 1 or obtained as claimed in claim 8.

* * * * *